United States Patent [19]
Foote

[11] Patent Number: 6,102,616
[45] Date of Patent: Aug. 15, 2000

[54] WAVE BREAK

[76] Inventor: Howard G. Foote, Rte. 1, Box 694, Blue Eye, Mo. 65611

[21] Appl. No.: 09/289,359

[22] Filed: Apr. 9, 1999

[51] Int. Cl.[7] .................................................... E02B 3/04
[52] U.S. Cl. ............................... 405/26; 405/23; 405/21
[58] Field of Search ................................. 405/26, 23, 21, 405/27, 28, 35, 63, 64, 22

[56] References Cited

U.S. PATENT DOCUMENTS

| | | | |
|---|---|---|---|
| 3,864,920 | 2/1975 | Tazaki et al. | 405/27 |
| 3,877,233 | 4/1975 | Olsen | 405/27 |
| 4,691,661 | 9/1987 | Deiana | 405/26 |
| 4,712,944 | 12/1987 | Rose | 405/26 |
| 4,715,744 | 12/1987 | Richey | 405/26 |
| 5,707,172 | 1/1998 | Wilcox | 405/26 |
| 5,827,011 | 10/1998 | Kann | 405/26 |

FOREIGN PATENT DOCUMENTS

| | | | |
|---|---|---|---|
| 145205 | 11/1980 | Japan | 405/26 |
| 89610 | 7/1981 | Japan | 405/26 |

*Primary Examiner*—Eileen Dunn Lillis
*Assistant Examiner*—Frederick L. Lagman
*Attorney, Agent, or Firm*—Frank J. Catalano

[57] ABSTRACT

A break intercepts waves moving in an anticipated direction along a water surface. Modular elongated floats are aligned end-to-end and extend generally perpendicular to the anticipated direction of the waves. Modular elongated ballast containers aligned end-to-end depend from the floats. The float is wider than the waves. Ballast in the containers is coordinated with the buoyancy of the floats so that the floats extend higher above the water surface than the waves and the container depends below the water surface by a distance greater than the width of the waves. The lower portion of the ballast container face which intercepts the waves is disposed at an angle so as to downwardly deflect the waves. Thus, the float is wide enough to cut off the upper portion of the waves and the lower portion of the container is positioned to intercept and downwardly deflect the lower portion of the waves. A pair of parallel spaced apart cables which extend through guides fixed to and above the floats are kept in tension to maintain the alignment of the floats. Since the cables are above the floats, they are also normally above the water surface, thus minimizing corrosion.

20 Claims, 4 Drawing Sheets

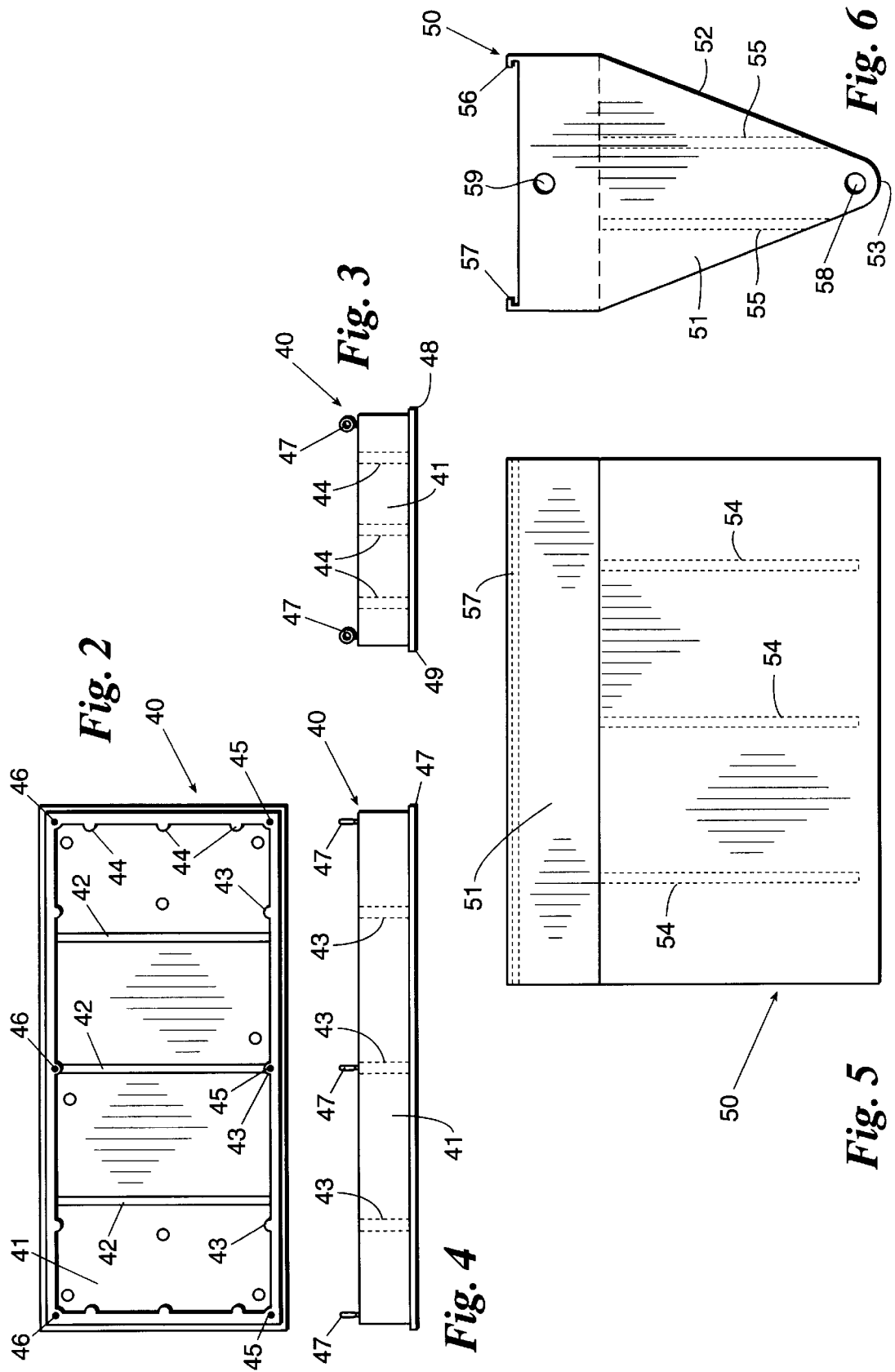

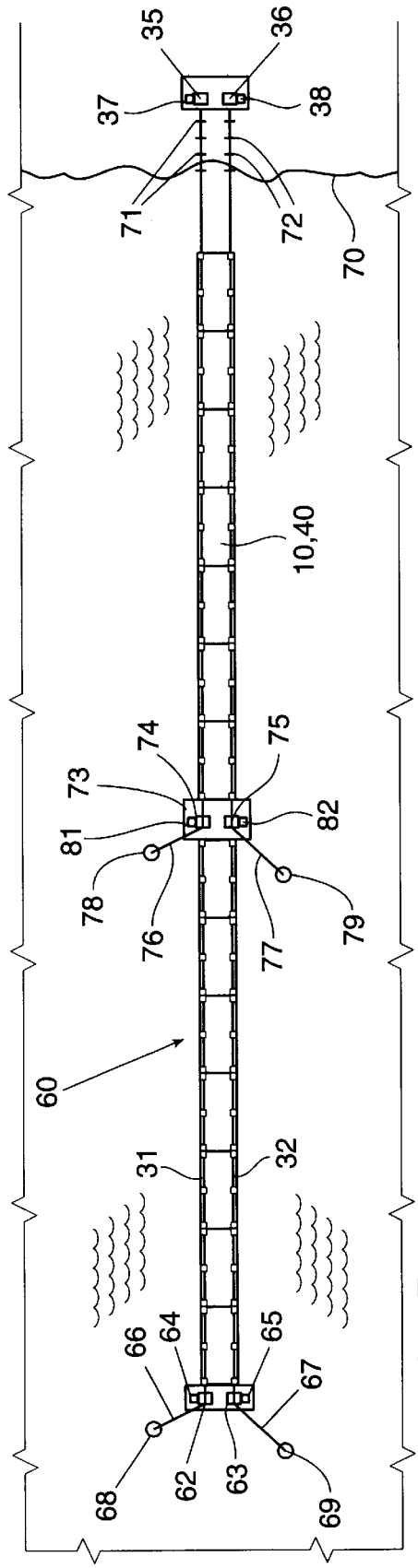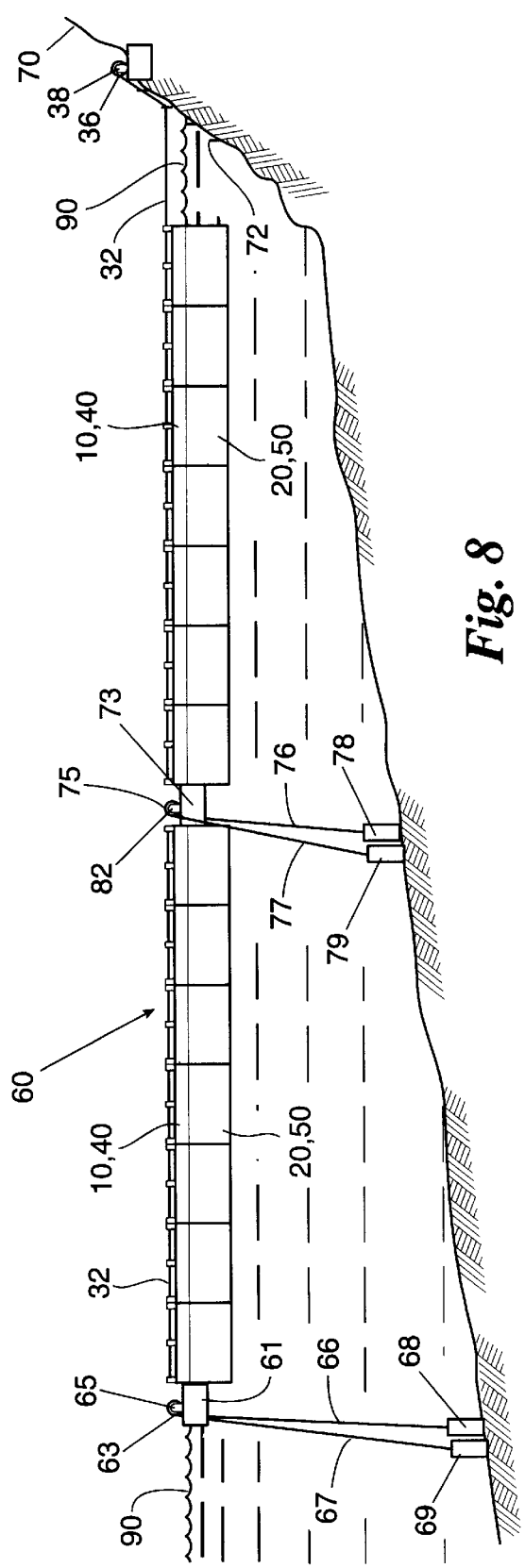

WAVE BREAK

BACKGROUND OF THE INVENTION

This invention relates generally to wave control equipment and more particularly concerns a break for intercepting and dissipating waves approaching boat docks and marinas.

Wave breaks for the protection of boat docks and marinas are generally formed from discarded automobile tires tangentially connected using belts and bolts with a cable woven through to openings in the tires. However, since the cable is woven, it cannot be significantly tensioned and, in turbulent water, the break becomes twisted and distorted and does not maintain an adequate wave breaking surface. Flotation is achieved by use of crescent-shaped pieces of foam inserted in the upper half of the tires. However, because of their weight, the tires are often positioned at or below the water line especially after one or two years of use. Consequently, larger waves tend to ride over the tires and continue shoreward without appreciable reduction in their size or strength. In addition, since the only imbalance in weight is the added foam, the center of gravity of the overall combination is relatively high and the tires tend to tip and even roll over in turbulence. Furthermore, since the connecting elements, including the cable line, are under water in even the best of conditions, damage to the break by corrosion is difficult to avoid. Moreover, the tendency of the tires to ride at or below the water line makes them difficult to observe during times of high visibility, much less in inclement conditions when the skies are cloudy and the water is turbulent.

It is, therefore, an object of this invention to provide a wave break which extends above the water surface to a height higher than the anticipated height of the waves to be dissipated. It is a further object of this invention to provide a wave break which is wider than the anticipated width of the waves to be dissipated. Another object of this invention is to provide a wave break which extends below the water surface to a depth greater than the anticipated width of the waves to be dissipated. Yet another object of this invention is to provide a wave break which has a lower wave interrupting surface angled to downwardly deflect the waves to be dissipated. Still another object of this invention is to provide a wave break of long life by reducing the possibility of cable corrosion. A further object of this invention is to provide a wave break having an upper float portion and a lower ballast portion so as to stabilize the break in turbulent conditions. Similarly, it is an object of this invention to provide a stable wave break having a relatively low center of gravity. And it is an object of this invention to provide a wave break which maintains its alignment in turbulent water.

SUMMARY OF THE INVENTION

In accordance with the invention, a break for intercepting waves moving in an anticipated direction along a water surface is formed from a plurality of elongated floats aligned end-to-end and extending generally perpendicular to the anticipated direction of the waves with a plurality of elongated ballast containers aligned end-to-end depending from the floats. Preferably, each of the containers has a first aperture in its lower portion for admitting water as ballast and a second aperture in its upper portion for venting air as water is admitted. The float is wider than the waves. The volume of the containers is coordinated with the buoyancy of the floats so that, when the container is filled with ballast, the break has a relatively low center of gravity. Preferably, the float extends higher above the water surface than the waves and the container depends below the water surface by a distance greater than the width of the float. The lower portion of the container face intercepting the waves is disposed at an angle so as to downwardly deflect the waves. Thus, the float is wide enough to cut off the upper portion of the waves and the lower portion of the container is positioned to intercept and downwardly deflect the lower portion of the waves. A pair of parallel spaced apart cables which extend through guides fixed to and above the floats are kept in tension to maintain the alignment of the floats. Since the cables are above the floats, they are also normally above the water surface, thus minimizing corrosion.

The off-shore ends of the aligning cables are fixed. Preferably, a floating platform is located adjacent the last float at the off-shore ends of the cables. The aligning cables are fastened to the platform which is in turn anchored to the bottom of the body of water. A pair of cable reels collecting and dispensing the aligning cables is located on shore and winches are connected to the cable reels to draw the aligning cables tight during installation or if the water level changes significantly after installation. Clamps are fastened to the aligning cables, one immediately after each shoremost guide of each float for each aligning cable, to prevent the floats from sliding along the aligning cables away from the platform. The off-shore platform is anchored by a pair of concrete filled drums or barrels oppositely laterally and off-shorewardly oriented from the platform. A second pair of cables connected to the barrels is dispensed from or collected on a second pair of cable reels mounted on the off-shore platform. A second pair of winches connected to the platform mounted cable reels is used to collect or dispense the platform cables to properly position the platform during installation or if the water level changes significantly after installation.

For breaks having a large number of floats, such as more than twelve, an intermediate floating platform may be located within the chain of floats and independently anchored to the bottom of the body of water to maintain the stability of the break. The intermediate platform is anchored to the bottom of the water body by a second pair of concrete-filled drums or barrels oppositely laterally oriented from the intermediate platform. A third pair of cables connected to the intermediate platform barrels is dispensed from or collected on a third pair of cable reels mounted on the intermediate platform. A third pair of winches connected to the cable reels on the intermediate platform allows adjustment of the intermediate platform cables to properly position the intermediate platform during installation or if the water level changes significantly after installation.

Preferably, the floats are foam filled polyethylene shells of rectangular cross-section taken in the anticipated direction of the waves and the containers are polyethylene shells of pentagonal cross-section taken in the anticipated direction of the waves. Most preferably, the container pentagonal cross-section has a rectangular upper portion and an isosceles triangular lower portion with equal angles within a range of 45 to 72.5 degrees. Preferably, each of the floats has two parallel channels fixed to its underside and extending along its edges and each of the containers has two parallel flanges fixed to its upper side which slidably engage in the channels to suspend the containers from the floats. The flanges are fastened in the channels by screws. The location of the channels and flanges can be reversed. Finally, a plurality of lights are mounted atop and spaced along the platforms and floats as necessary to illuminate the break during times of poor visibility.

BRIEF DESCRIPTION OF THE DRAWINGS

Other objects and advantages of the invention will become apparent upon reading the following details description and upon reference to the drawings in which:

FIG. 2 is a top plan view of the float of FIG. 1;

FIG. 3 is an end elevation view of the float of FIG. 1;

FIG. 4 is a side elevation view of the float of FIG. 1;

FIG. 5 is a side elevation view of the container of FIG. 1;

FIG. 6 is an end elevation view of the container of FIG. 1;

FIG. 7 is a top plan view of a wave break assembled using the float and container modules of FIG. 1;

FIG. 8 is a side elevation view of the wave break of FIG. 7; and

While the invention will be described in connection with preferred embodiments, it will be understood that it is not intended to limit the invention to these embodiments. On the contrary, it is intended to cover all alternatives, modifications and equivalents as may be included within the spirit and scope of the invention as defined by the appended claims.

DETAILED DESCRIPTION

Figure 1:
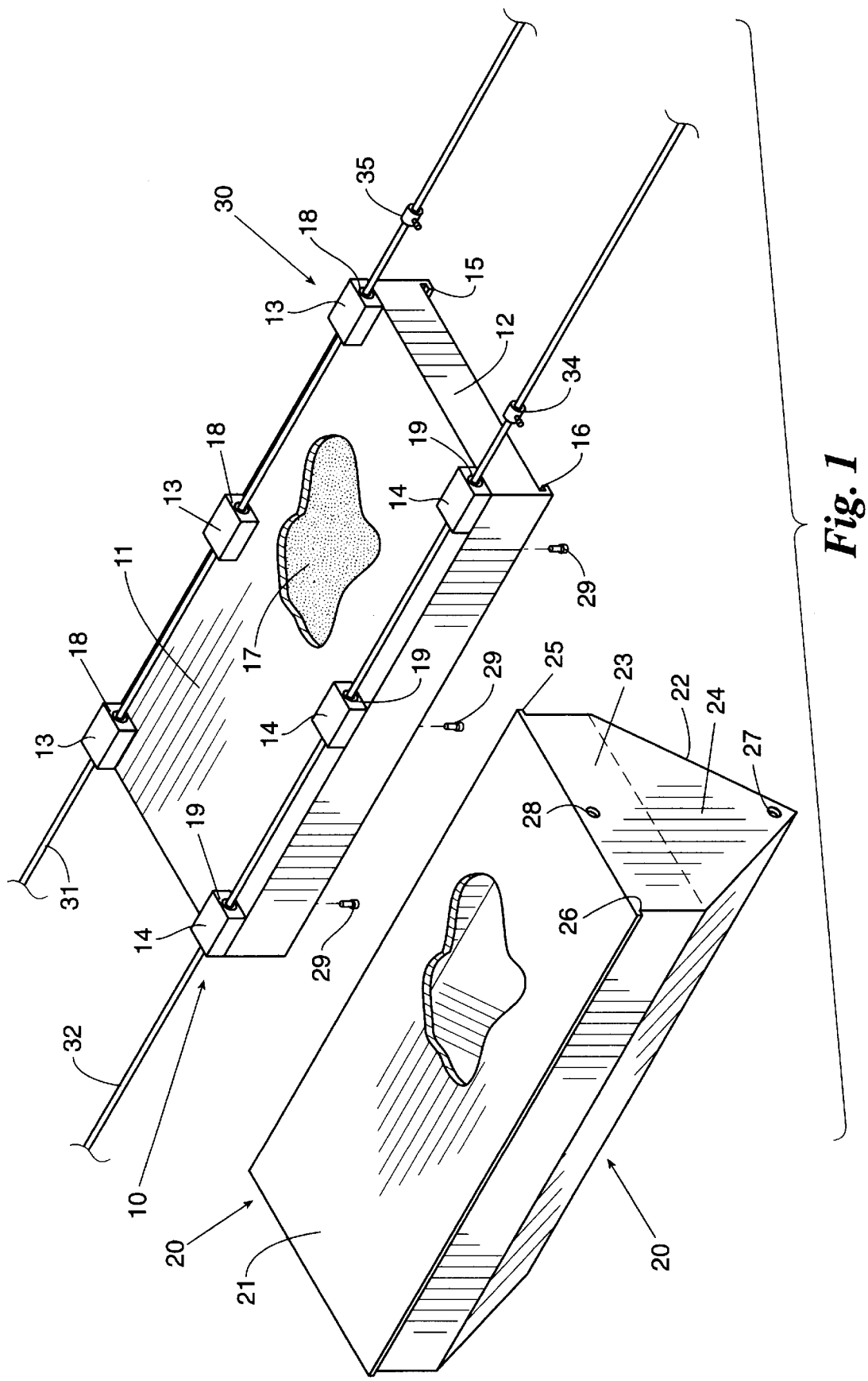
FIG. 1 is a perspective assembly view of a preferred embodiment of the float and container modules of the wave break.

Turning first to FIG. 1, a wave break is formed from combined modules of floats 10 and ballast compartments 20 which are slidably engaged on a cable system 30. The float 10 is an elongated shell 11 of substantially rectangular cross-section 12 taken in a direction transverse to the longitudinal axis of the float 10 or perpendicular to the anticipated direction of the waves to be dissipated. Two sets of cable guides 13 and 14 fixed to or integral with the upper surface of the floats 10 are aligned to receive the parallel spaced apart aligning cables 31 and 32, respectively, therethrough. Parallel spaced apart channels 15 and 16 are formed along each underside edge of the float 10. Preferably, the float shell 11 is polyethylene and is filled with foam 17. The polyethylene guides 13 and 14 are fitted with replaceable steel sleeves 18 and 19 which receive the steel cables 31 and 32. As shown, the channels 15 and 16 are formed by use of polyethylene angle members attached to or molded to the underside of the shell 11. The ballast compartment 20 is an elongated shell 21 of substantially pentagonal cross-section 22 taken in a direction transverse to the longitudinal axis of the float 10 or perpendicular to the anticipated direction of the waves to be dissipated. As shown, the cross-section 22 has an upper rectangular portion 23 and a lower triangular portion 24. A pair of flanges 25 and 26 extend outwardly from the upper longitudinal edges of the ballast compartment 20. The compartment 20 has at least one aperture 27 at its lower portion to admit water as ballast into the shell 21 and at least one upper aperture 28 to exhaust air from the shell 21 as water is ingested. The flanges 25 and 26 of the ballast compartment 20 are slidably engaged in the channels 15 and 16 of the float 10 and screws 29 secure the ballast compartment 20 in place below the float 10. The float 10 is prevented from sliding in one direction along the cables 31 and 32 by cable clamps 33 and 34.

Looking at FIGS. 2 through 6, another embodiment of the wave break float and ballast compartment modules is illustrated. As shown, the float 40, preferably consisting of a polyethylene shell filled with foam, is provided with ribs 42, 43 and 44 in its horizontal, side and end walls, respectively, to provide additional strength to the float shell 41. This configuration is especially preferred in larger wave break modules. As shown, the ribbed float 40 is provided with two sets of apertures 45 and 46 in which eye hooks 47 may be threaded or otherwise mounted to receive the cables 31 and 32. Also, as shown in relation to this embodiment, the flanges 48 and 49 extend outwardly from the lower edges of the float 40. The ballast compartment 50 is also a polyethylene shell 51 having a substantially pentagonal cross-section 52 with a rectangular upper portion and a substantially triangular lower portion. As shown, the lower end 53 of the triangular portion is curved and the sidewalls and end walls of the triangular portion are provided with ribs 54 and 55, respectively. As shown in relation to this embodiment, the channels 56 and 57 are fixed to the top of the upper surface of the ballast compartment 50 and slide over the flanges 48 and 49 on the float 40. Again, the location of the channels and flanges may be reversed.

Water inlet and air outlet apertures 58 and 59, respectively, allow water to be ingested into the container 50 as ballast.

Turning now to FIGS. 7 and 8, the incorporation of the float and ballast compartment modules into a complete wave break 60 is illustrated. An off-shore platform 61, preferably a steel plate supported by a flotation module, is permanently anchored in an off-shore position. The platform 61 supports a pair of cable reels 62 and 63 operated by a pair of winches 64 and 65. The reels 62 and 63 dispense and collect platform cables 66 and 67 which extend to and are fixed to a pair of concrete-filled barrels or drums 68 and 69 which are positioned off-shorewardly and outwardly of the intended location of the platform 61. The float alignment cables 31 and 32 are dispensed and collected from a pair of cable reels 35 and 36 operated by winches 37 and 38. The alignment cable reels 35 and 36 and winches 37 and 38 are located on shore 70, preferably at an elevation higher than any anticipated level of the body of water. Two sets of eye hooks 71 and 72 are fixed to the shore 70 at various elevations between the anticipated high and low water levels of the water body 90. A plurality of floats 10 or 40 are coupled to a plurality of ballast compartments 20 or 50 and the alignment cables 31 and 32 are threaded through the guides on the floats 10 or 40 so that the floats 10 or 40 and the compartments 20 or 50 extend along the aligning cables 31 and 32 in end-to-end relationship. As shown in FIGS. 7 and 8, fourteen floats 10 or 40 and ballast compartments 20 or 50 are used. It is preferred, as is shown, that where more than twelve floats 10 or 40 are used, that an intermediate stabilizing platform 73 is inserted in the chain of floats 10 or 40. Preferably, the platform 73 consists of a steel plate supported by a flotation module, similar to the off-shore platform 61. A pair of cable reels 74 or 75 which collect and dispense cables 76 and 77 are mounted on the intermediate platform 73. The cables 76 and 77 extend from the reels 74 and 75 to concrete filled barrels or drums 78 and 79 which are disposed laterally on either side of the intended location of the intermediate platform 73. If fewer than twelve floats 10 or 40 are employed, the intermediate platform 73 is generally unnecessary. However, if significantly more than twelve floats 10 or 40 are employed, it may be desirable to space more than one intermediate platform 73 in the chain. The offshore ends of the aligning cables 31 and 32 are connected to the offshore platform 61 and the shore ends of the aligning cables 31 and 32 are engaged under the eye hooks 71 and 72 which are closest to and above the water level 90 at the time of installation. The winches 37 and 38, 64 and 65 and 81 and 82 are operated to bring all of the cables 31 and 32, 66 and 67 and 76 and 77 into tension to secure the wave break 60 in position in the body of water. The cable clamps 33 and 34

(shown in FIG. 1) are then secured to the aligning cables 31 and 32 to assure that the floats 10 or 40 will not slide on the cables 31 and 32 toward the shore 70. If the water level changes significantly after installation, the tension in the aligning cables 31 and 32 is released to permit the cables 31 and 32 to be moved to the opposite eye hooks 71 and 72 and the various aligning and platform cable readjusted to properly position and align the break.

Figure 9:
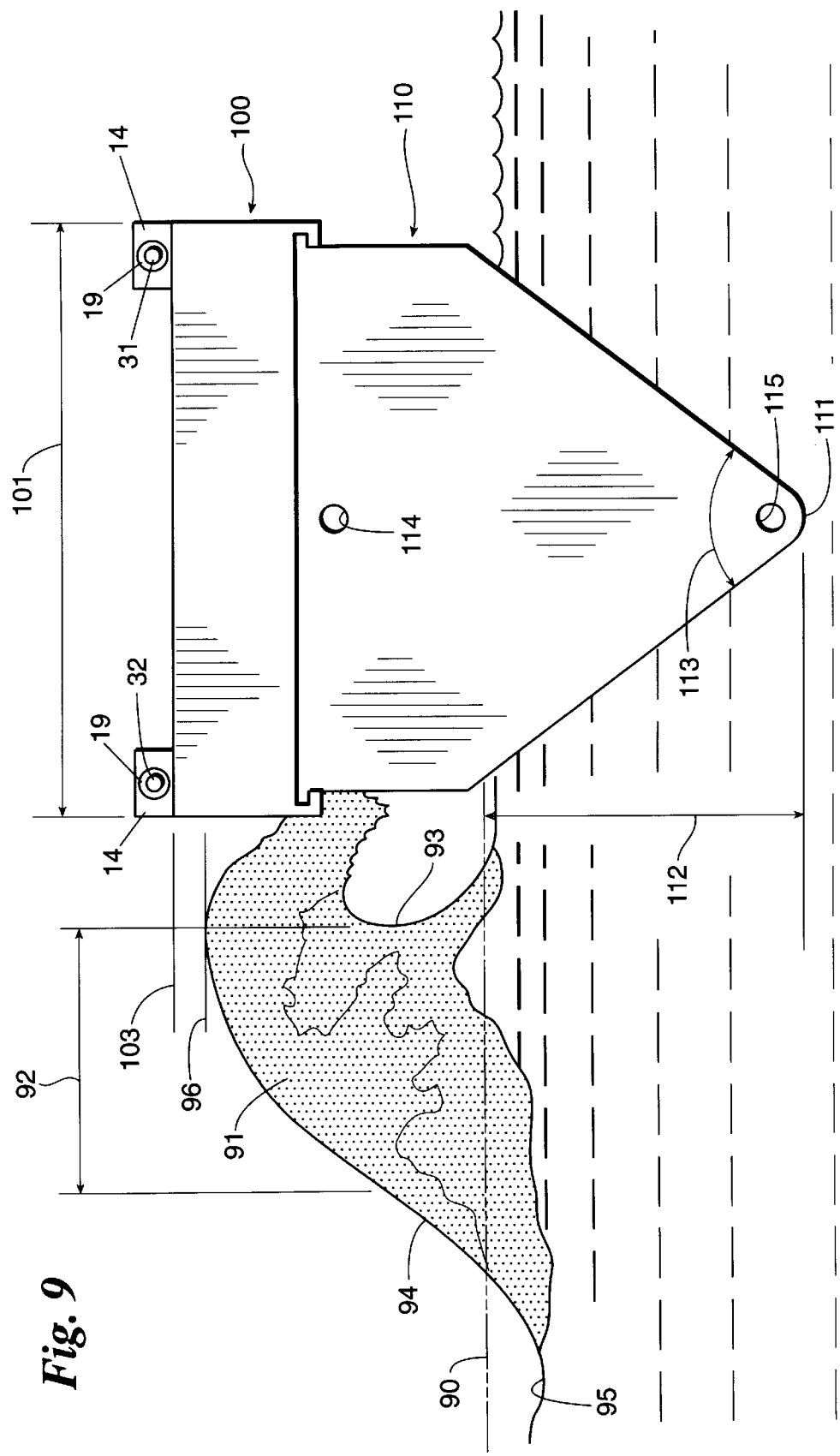
FIG. 9 is a side elevation view illustrating the modules of FIG. 1 in relation to an anticipated wave shape.

Turning now to FIG. 9, the preferred coordination of the dimensions of the float and ballast container modules with the anticipated wave forms is illustrated. The anticipated wave 91 has a width 92 extending from the inside edge of the wave tunnel 93 to the back 94 of the wave 91. Considering the water level 90 in turbulent conditions to be a line separating the wave trough 95 from the tunnel 93, the height of the wave will be determined as the distance from the water level 90 to the wave crest 96. To be most effective in dissipating the anticipated wave 91, the float 100 should have a width 101 greater than the width 92 of the wave 91. In addition, the break is most effective if the bottom 111 of the ballast container 110 depends below the water surface 90 by a distance 112 that is also greater than the width 92 of the wave 91. As shown, it is preferred that the triangular portion of the cross-section of the container 110 be isosceles with a lower angle 113 in a range of 35 and 90 degrees and preferably, as shown, at an angle of 75 degrees. Thus, the equal angles of the isosceles portion of the container 110 will be in a range of 45 to 72.5 degrees and preferably 52.5 degrees. Given the width 101 of the float 100 and ballast container 110 and the angular configuration of the triangular portion of the ballast container 110, the total height of the combination of the float 100 and ballast container 110 and the elevation of the air outlet aperture 114 of the ballast container 110 is coordinated so that, when the ballast container 110 has taken on maximum ballast by exhausting air from the air outlet aperture 114 as water is ingested through the water inlet aperture 115, the level 103 of the float 100 is above the crest 96 of the wave 91. Thus, it can be seen that the upper portion of the wave 91 will impinge against the vertical face of the float 100 and ballast container 110 while the lower portion of the wave 91 will impinge against the angled surface of the ballast container 113. Therefore, as the lower portion of the wave 91 is downwardly deflected, the ballast container 110 and the float 100 tend to be pushed upwardly to maintain the vertical surface of the float 100 and ballast container 110 in the path of the upper portion of the wave 91. Since the weight of the break is concentrated in the ballast in the lower portion of the ballast container 110, the break is less likely to tip in turbulent conditions. Moreover, since the width 101 of the float 100 is greater than the width 92 of the wave 91, even if a wave 91 should partly pass over the top of the float 100, the portion passing over the float 100 will be completely severed from the lower portion of the wave 91 so as to complete dissipation of the wave 91. In practice, it has been found that, in dealing with waves approximately two feet deep, a wave break using floats 100 in a range of one to two feet in height and four feet in width combined with ballast containers in a range of four to six foot in depth mounted on 3/8" galvanized aircraft cables functions effectively.

Thus, it is apparent that there has been provided, in accordance with the invention, a wave break that fully satisfies the objects, aims and advantages set forth above. While the invention has been described in conjunction with specific embodiments thereof, it is evident that many alternatives, modifications and variations will be apparent to those skilled in the art and in light of the foregoing description. For example, other embodiments can be made by combining selected features of those embodiments shown herein. Accordingly, it is intended to embrace all such alternatives, modifications and variations as fall within the spirit of the appended claims.

What is claimed is:

1. A break for intercepting waves moving in an anticipated direction along a water surface comprising:
   a plurality of elongated floats aligned end-to-end and extending generally perpendicular to the anticipated direction of the waves, said floats having a width greater than a width of the waves;
   a plurality of elongated containers aligned end-to-end, one depending from each of said floats, each of said containers having a first aperture in a lower portion thereof for admitting water as ballast therein and a second aperture in an upper portion thereof for venting air as the water is admitted, a volume of each said container being coordinated with a buoyancy of its respective said float so that, when said container is filled with ballast, said float extends above the water surface to a height greater than the height of the waves and said container depends below the surface by a distance greater than the width of the waves, each of said containers having a lower portion of a face upon which the waves impinge disposed at an angle to downwardly deflect the waves;
   a pair of parallel spaced apart cables extending through guides fixed to and above said floats; and
   means for tensioning said cables.

2. A break according to claim 1, said floats having a rectangular cross-section in the anticipated direction of the waves.

3. A break according to claim 2, each of said floats comprising a foam filled polyethylene shell.

4. A break according to claim 1, said containers having a pentagonal cross-section in the anticipated direction of the waves, said cross-section having a rectangular upper portion and a triangular lower portion.

5. A break according to claim 4, each of said containers comprising a polyethylene shell.

6. A break according to claim 5, said triangular portion of said cross-section being isosceles a base thereof being coincident with a bottom side of said rectangular portion of said cross-section.

7. A break according to claim 6, said isosceles portion of said cross-section having equal angles in a range of 45 to 72.5 degrees.

8. A break according to claim 1, each of said floats having two parallel channels fixed to an underside thereof, one extending along each edge thereof, and each of said containers having two parallel flanges fixed to an upper side thereof, said flanges being slidably engagable in said channels to suspend said containers from said floats.

9. A break according to claim 8 further comprising means for fastening said flanges in said channels.

10. A break for intercepting waves moving in an anticipated direction along a surface of a body of water comprising:
    a plurality of elongated floats aligned end-to-end and extending generally perpendicular to the anticipated direction of the waves, said floats having a width greater than a width of the waves;
    a plurality of elongated containers aligned end-to-end, one depending from each of said floats, each of said containers having a first aperture in a lower portion thereof for admitting water as ballast therein and a second aperture in an upper portion thereof for venting air as the water is admitted, a volume of each said container being coordinated with a buoyancy of its respective said float so that, when said container is filled with ballast, said float extends above the water surface to a height greater than the height of the waves and said container depends below the surface by a distance greater than the width of the waves, each of said containers having a lower portion of a face upon which the waves impinge disposed at an angle to downwardly deflect the waves;

a pair of parallel spaced apart cables extending through guides fixed to and above said floats;

means for anchoring one end of each of said cables to a bottom of the body of water; and means for pulling another end of each of said cables to tension said cables.

11. A break according to claim 10, said anchoring means comprising:

a floating platform adjacent a one of said floats at said one ends of said cables, said one ends of said cables being fastened to said platform;

means for anchoring said platform to the bottom of the body of water;

a pair of cable reels located on a shore of the body of water, one connected to each of said another ends of said cables; and a pair of winches, one connected to each of said cable reels.

12. A break according to claim 11 further comprising a plurality of clamps fastened to said cables, one clamp immediately located after each shoremost said guide of each said float for each said cable for preventing sliding of said floats away from said platform.

13. A break according to claim 12, said platform anchoring means comprising:

a pair of anchors oppositely laterally and off-shorewardly oriented from said platform;

a pair of cables, one connected to each of said anchors and extending to one of a pair of reels mounted on said platform; and a pair of winches, one connected to each of said platform mounted cable reels.

14. A break according to claim 13 further comprising:

an intermediate floating platform disposed in said plurality of floats; and means for anchoring said intermediate platform to the bottom of the body of water.

15. A break according to claim 12, said intermediate platform anchoring means comprising:

a pair of anchors oppositely laterally oriented from said intermediate platform;

a pair of cables, one connected to each of said intermediate platform anchors and extending to one of a pair of reels mounted on said intermediate platform; and a pair of winches, one connected to each of said intermediate platform mounted cable reels.

16. A break according to claim 10 further comprising a plurality of lights mounted atop and spaced along said platforms and floats.

17. A break for intercepting waves moving in an anticipated direction along a water surface comprising:

a plurality of elongated floats aligned end-to-end and extending generally perpendicular to the anticipated direction of the waves; and a plurality of elongated containers aligned end-to-end, one depending from each of said floats; each of said containers adapted to contain ballast therein, a volume of each said container being coordinated with a buoyancy of its respective said float so that said float extends above the water surface to a height greater than the height of the waves and said container depends below the surface by a distance greater than the width of the waves, each of said containers having a lower portion of a face upon which the waves impinge disposed at an angle to downwardly deflect the waves.

18. A break according to claim 17 further comprising a pair of parallel spaced apart cables extending through guides fixed to and above said floats.

19. A break according to claim 18 further comprising means for tensioning said cables.

20. A break according to claim 17, further comprising a first aperture in a lower portion of each of said containers for admitting water as ballast therein and a second aperture in an upper portion of each of said containers for venting air as the water is admitted.

* * * * *